United States Patent
Toyoshima et al.

(10) Patent No.: US 10,113,896 B2
(45) Date of Patent: Oct. 30, 2018

(54) LIQUID RESERVOIR WITH A PLURALITY OF LIQUID LEVEL DETECTION UNITS

(71) Applicant: Mitsubishi Electric Corporation, Tokyo (JP)

(72) Inventors: Masaki Toyoshima, Tokyo (JP); Yasutaka Ochiai, Tokyo (JP); Makoto Saito, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 74 days.

(21) Appl. No.: 15/514,838

(22) PCT Filed: Oct. 16, 2014

(86) PCT No.: PCT/JP2014/077576
§ 371 (c)(1),
(2) Date: Mar. 28, 2017

(87) PCT Pub. No.: WO2016/059706
PCT Pub. Date: Apr. 21, 2016

(65) Prior Publication Data
US 2017/0211960 A1 Jul. 27, 2017

(51) Int. Cl.
*G01F 23/24* (2006.01)
*G01F 23/00* (2006.01)
(Continued)

(52) U.S. Cl.
CPC ........ *G01F 23/0061* (2013.01); *F25B 43/006* (2013.01); *G01F 23/22* (2013.01);
(Continued)

(58) Field of Classification Search
CPC .... G01F 23/246; G01F 23/247; G01F 23/248; G01F 23/24; G01F 23/241; G01F 23/242;
(Continued)

(56) References Cited

U.S. PATENT DOCUMENTS 4,736,623 A * 4/1988 Brown ................ G01M 3/3245
340/605
5,148,708 A * 9/1992 Murata ................ G01F 23/242
338/38

(Continued)

FOREIGN PATENT DOCUMENTS

JP 04-053245 B2 8/1992
JP 06-201234 A 7/1994
(Continued)

OTHER PUBLICATIONS

International Search Report of the International Searching Authority dated Nov. 18, 2014 for the corresponding international application No. PCT/JP2014/077576 (and English translation).
(Continued)

*Primary Examiner* — Justin Olamit
(74) *Attorney, Agent, or Firm* — Posz Law Group, PLC

(57) ABSTRACT

A liquid reservoir includes at least one liquid surface level detection unit in the liquid reservoir. The at least one liquid surface level detection unit includes a plurality of liquid surface level detection units. The plurality of liquid surface level detection units each include a plurality of self-heating sensors. The plurality of self-heating sensors are positioned at different heights.

4 Claims, 5 Drawing Sheets

(51) Int. Cl.
*G01F 23/22* (2006.01)
*F25B 43/00* (2006.01)

(52) U.S. Cl.
CPC .......... *G01F 23/243* (2013.01); *G01F 23/247* (2013.01); *G01F 23/248* (2013.01); *F25B 2700/04* (2013.01)

(58) Field of Classification Search
CPC ...... G01F 23/26; G01F 23/261; G01F 23/263; G01F 23/268
See application file for complete search history.

(56) References Cited

U.S. PATENT DOCUMENTS

| | | | | |
|---|---|---|---|---|
| 5,156,047 A | * | 10/1992 | Tuma | G01F 23/24 340/620 |
| 8,903,676 B2 | * | 12/2014 | Landry | G01C 13/002 702/127 |
| 2007/0195855 A1 | * | 8/2007 | Hetzler | G01F 23/22 374/100 |
| 2013/0177122 A1 | | 7/2013 | Fushimi et al. | |

FOREIGN PATENT DOCUMENTS

| | | |
|---|---|---|
| JP | 2004-239711 A | 8/2004 |
| JP | 4553201 B2 | 7/2010 |
| JP | 2013-140100 A | 7/2013 |
| WO | WO 2014184294 A1 * 11/2014 | ......... G01F 23/0007 |

OTHER PUBLICATIONS

Office Action dated Mar. 7, 2017 issued in the corresponding Japanese Patent Application No. 2016-553930 (and English translation).

* cited by examiner

LIQUID RESERVOIR WITH A PLURALITY OF LIQUID LEVEL DETECTION UNITS

CROSS REFERENCE TO RELATED APPLICATION

This application is a U.S. national stage application of PCT/JP2014/077576 filed on Oct. 16, 2014, the contents of which are incorporated herein by reference.

TECHNICAL FIELD

The present invention relates to a liquid reservoir,

BACKGROUND ART

A known technology to determine presence or absence of liquid utilizing a characteristic of a thermistor of which temperature changes depending on the presence or absence of the liquid when the thermistor self-heats. As a liquid surface detection device using such a technology, for example, a liquid surface detection device includes a plurality of thermistor resistive layers arranged sequentially from the upper side to the lower side (for example, see Patent Literature 1).

CITATION LIST

Patent Literature

Patent Literature 1: Japanese Unexamined Patent Application Publication No. 2004-239711 ([0005], FIG. 6)

SUMMARY OF INVENTION

Technical Problem

However, in the liquid surface detection device disclosed in Patent Literature 1, as the plurality of thermistor resistive layers are arranged in a line in the vertical direction, when the number of thermistor resistive layers is increased to enhance accuracy of detecting a liquid surface, wiring becomes complicated. In other words, routing the wiring has a constraint. Regarding the constraint in routing the wiring, when cables of the thermistor resistive layers are bundled, and the bundled cables are allowed to pass through a long sheath tube extending in the vertical direction, the sheath tube has a constraint of inner diameter, and hence the number of thermistor resistive layers arranged in one sheath tube is limited. Consequently, when a large number of thermistor resistive layers are arranged in the vertical direction of one sheath tube, an interval between thermistor resistive layers adjacent to each other in the vertical direction of the sheath tube is difficult to be reduced. As described above, the reduced interval between the thermistor resistive layers adjacent to each other in the vertical direction of the sheath tube is difficult to be achieved, and hence a detection resolution is reduced.

The present invention has been made on the background of the above-mentioned problems, and therefore has an object to provide a liquid reservoir having a less frequent constraint in routing wiring than that in the related art.

Solution to Problem

A liquid reservoir according to one embodiment of the present invention includes at least one liquid surface level detection unit in the liquid reservoir. The at least one liquid surface level detection unit includes a plurality of liquid surface level detection units. The plurality of liquid surface level detection units each include a plurality of self-heating sensors. The plurality of self-heating sensors are positioned at different heights,

Advantageous Effects of Invention

In the liquid reservoir of the embodiment of the present invention, the plurality of liquid surface level detection units each include the plurality of self-heating sensors, and all of the self-heating sensors are positioned at different heights. Consequently, the constraint in routing the wiring is less frequent than that in the related art.

DESCRIPTION OF EMBODIMENTS

A refrigerating and air-conditioning apparatus 100 according to the present invention is described below in detail with reference to the drawings. Note that, the relations between the sizes of components in the following drawings may be different from the actual relations. Further, in the following drawings, components denoted by the same reference signs correspond to the same or equivalent components. The reference signs are common throughout the description. In addition, the described forms of the components are merely examples, and the components are not limited to the description.

Embodiment 1

Figure 1:
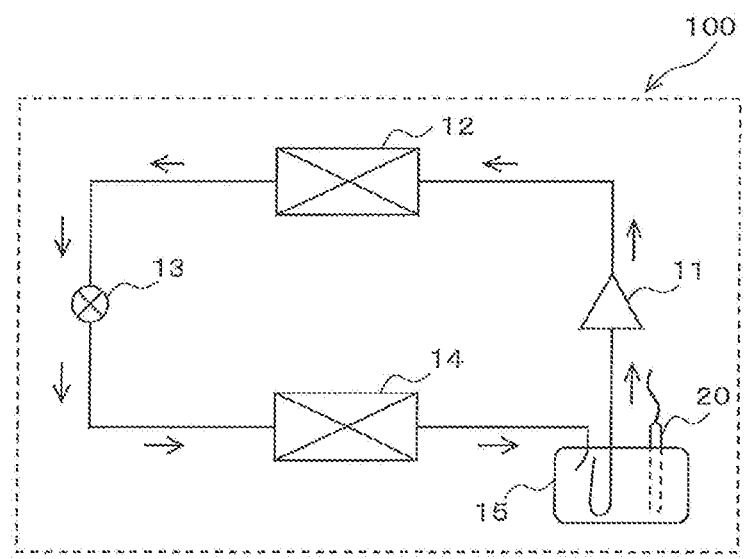
FIG. 1 is a schematic diagram for illustrating a refrigerating and air-conditioning apparatus 100 in which a liquid reservoir 15 according to Embodiment 1 of the present invention is arranged on a refrigerant circuit.
Figure 2:
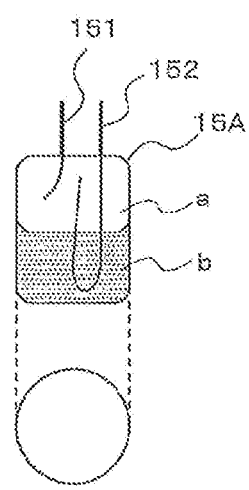
FIG. 2 is a schematic diagram for illustrating the liquid reservoir 15 according to Embodiment 1 of the present invention.
Figure 3:
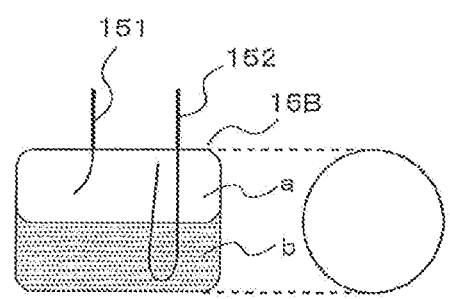
FIG. 3 is a schematic diagram for illustrating the liquid reservoir 15 according to Embodiment 1 of the present invention.

FIG. 1 is a schematic diagram for illustrating the refrigerating and air-conditioning apparatus 100 in which a liquid reservoir 15 according to Embodiment 1 of the present invention is arranged on a refrigerant circuit. FIG. 2 is a schematic diagram for illustrating the liquid reservoir 15 according to Embodiment 1 of the present invention. FIG. 3 is a schematic diagram for illustrating the liquid reservoir 15 according to Embodiment 1 of the present invention.

As illustrated in FIG. 1, the refrigerating and air-conditioning apparatus 100 includes a compressor 11, a condenser 12, an expansion valve 13, an evaporator 14, and the liquid reservoir 15. The compressor 11, the condenser 12, the expansion valve 13, the evaporator 14, and the liquid reservoir 15 are sequentially connected by pipes, for example, to form the refrigerating and air-conditioning apparatus 100. A direction of the arrows indicates a direction in which refrigerant flows.

The compressor 11 is a compressor having a variable capacity and configured to compress sucked refrigerant to discharge the compressed refrigerant as refrigerant having a high temperature and a high pressure. The condenser 12 is a heat exchanger configured to condense and liquefy the refrigerant discharged from the compressor 11. The expansion valve 13 is arranged on an outlet side of the condenser 12 and an inlet side of the evaporator 14, and is configured to act as a pressure reducing unit for reducing the pressure of the refrigerant flowing on the outlet side of the condenser 12. The evaporator 14 is a heat exchanger configured to evaporate and gasify the refrigerant reduced in pressure by the expansion valve 13.

During a heating operation, the refrigerant flowing through the condenser 12 exchanges heat with indoor air in the condenser 12, and the refrigerant flowing through the evaporator 14 exchanges heat with outdoor air in the evaporator 14. Further, during a cooling operation, the refrigerant flowing through the condenser 12 exchanges heat with outdoor air in the condenser 12, and the refrigerant flowing through the evaporator 14 exchanges heat with indoor air in the evaporator 14.

As illustrated in FIG. 2 and FIG. 3, the liquid reservoir 15 is a pressure vessel, for example, and includes a vessel having a thickness of from 4 m to 10 m. The liquid reservoir 15 has the structure in which liquid refrigerant is collected in its lower portion, and in which only gas refrigerant tends to be circulated. With this structure, with an increase in circulation amount of the refrigerant, a speed of the gas portion is increased, whereas a speed of the liquid portion becomes less likely to increase. In an upper portion of the liquid reservoir 15, an inflow pipe 151 and an outflow pipe 152 are arranged to vertically penetrate an upper surface of the liquid reservoir 15. A region in which the gas refrigerant is collected is indicated by the letter a in FIG. 2 and FIG. 3. A region in which the liquid refrigerant is collected is indicated by the letter b in FIG. 2 and FIG. 3.

The inflow pipe 151 is a pipe for guiding the refrigerant flowing on an outlet side of the evaporator 14 into the liquid reservoir 15, and is arranged to communicate with the inside of the liquid reservoir 15 and the outside of the liquid reservoir 15. The inflow pipe 151 is arranged so that a fluid flowing into the liquid reservoir 15 flows in a horizontal direction with respect to an installation surface of the liquid reservoir 15. With this configuration, fluctuations of a surface of liquid in the liquid reservoir 15 may be reduced as much as possible. The outflow pipe 152 is a pipe for guiding the refrigerant inside the liquid reservoir 15 to a suction side of the compressor 11, and is arranged to communicate with the inside of the liquid reservoir 15 and the outside of the liquid reservoir 15, As the liquid reservoir 15, a vertical vessel or a horizontal vessel is adopted. The term "vertical vessel" refers to an upright cylindrical vessel having a vertically long aspect ratio as illustrated in FIG. 2, for example. Further, the term "horizontal vessel" refers to a laid-down cylindrical vessel having a horizontally long aspect ratio as illustrated in FIG. 3, for example.

Figure 4:
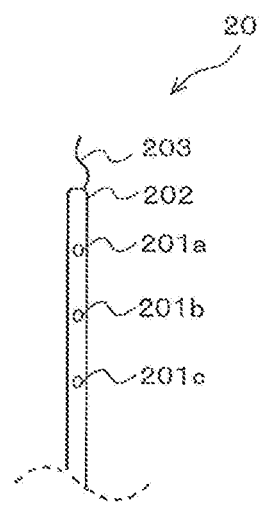
FIG. 4 is a schematic diagram for illustrating a part of a liquid surface level detection unit 20 of the liquid reservoir 15 according to Embodiment 1 of the present invention.

FIG. 4 is a schematic diagram for illustrating a part of a liquid surface level detection unit 20 of the liquid reservoir 15 according to Embodiment 1 of the present invention. As illustrated in FIG. 4, the liquid surface level detection unit 20 is configured to determine a level of the surface of the liquid collected inside the liquid reservoir 15, and includes self-heating sensors 201a to 201c (liquid surface sensors), a sheath tube 202, and wiring 203.

Each of the self-heating sensors 201a to 201c is a self-heating element made of a material whose element resistance changes depending on an element temperature, and includes, for example, an NTC sensor or a PTC sensor. The self-heating sensors 201a to 201c have different heat transfer coefficients, and hence amounts of transferred heat differ depending on an outside state (liquid or gas). Consequently, the self-heating sensors have different temperatures depending on whether the outside state is a liquid state or a gas state, for example. Comparing these temperatures distinguishes whether each of the self-heating sensors 201a to 201c is surrounded by gas or liquid. In the following description, the self-heating sensors arranged in the liquid surface level detection unit 20 may be collectively referred to as "self-heating sensors 201" in some cases.

The sheath tube 202 is configured to contain the self-heating sensors 201, and includes a cylindrical member, for example. Inside the sheath tube 202, a plurality of self-heating sensors 201 are arranged at equal intervals in the vertical direction, for example. The sheath tube 202 has a constraint of inner diameter, and hence the number of self-heating sensors 201 arranged in one sheath tube 202 is limited. Consequently, the interval between self-heating sensors 201 adjacent to each other in the vertical direction is determined in consideration of the inner diameter of the sheath tube 202. The wiring 203 is a conductor wire for transmitting a signal detected by each of the self-heating sensors 201 to a control unit (not shown), and is provided for each self-heating sensor 201. The wiring 203 for each one of the self-heating sensors 201 is bundled and allowed to pass through the sheath tube 202. The control unit is configured to determine the level of the surface of the liquid in the liquid reservoir 15 on the basis of the signal of the self-heating sensor 201 input through the wiring 203.

Figure 5:
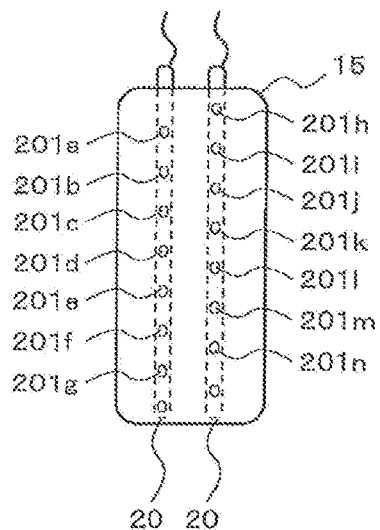
FIG. 5 is a schematic diagram for illustrating a state in which the liquid reservoir 15 according to Embodiment 1 of the present invention accommodates the liquid surface level detection unit 20.

FIG. 5 is a schematic diagram for illustrating a state in which the liquid reservoir 15 according to Embodiment 1 of the present invention accommodates the liquid surface level detection units 20. As illustrated in FIG. 5, as the liquid reservoir 15, a vertical vessel is adopted. Self-heating sensors 201a to 201n are aligned in a direction perpendicular to a bottom surface of the liquid reservoir 15, for example. In one of the liquid surface level detection units 20 positioned on the left side of the drawing sheet of FIG. 5, the self-heating sensors 201a to 201g are arranged. In one of the liquid surface level detection units 20 positioned on the right side of the drawing sheet of FIG. 5, the self-heating sensors 201h to 201n are arranged.

From an upper side of the liquid reservoir 15, the self-heating sensors 201h, 201a, 201i, 201b, 201j, 201c, 201k,

201d, 201l, 201e, 201m, 201f, 201n, and 201g are arranged. Thus, the self-heating sensors 201a to 201g and the self-heating sensors 201h to 201n are arranged at different height positions from each other. In other words, the self-heating sensors 201a to 201n are arranged in zigzag. Further, the self-heating sensors 201a to 201g are arranged so that distances between adjacent self-heating sensors are equal, for example. The self-heating sensors 201h to 201n are arranged so that distances between adjacent self-heating sensors are equal, for example.

As described above, in the liquid reservoir 15 of Embodiment 1 of the present invention, the plurality of liquid surface level detection units 20 each include the plurality of self-heating sensors 201, and all of the self-heating sensors 201 are positioned at different heights. In addition, the plurality of self-heating sensors 201 are arranged in zigzag.

With this configuration, fewer constraints are imposed in routing the wiring than that in the related art. Consequently, a larger number of self-heating sensors 201 may be arranged than that in the related art, and a resolution of determining a liquid amount is improved. With this configuration, even when the refrigerant is changed by a minute amount, the change is detected, and hence leakage of the refrigerant from the refrigerating and air-conditioning apparatus 100 is detected in an early stage. In particular, when a refrigerant having adverse effects on the global environment, such as global warming, is used, the leakage of the refrigerant is prevented from occurring, and thus this configuration advantageously leads to protection of the global environment.

Embodiment 1 describes the example in which 16 self-heating sensors 201 are arranged. However, the example is merely for the description, and a specific number is not limited to this example. Any number of self-heating sensors 201 may be arranged as long as the liquid surface level detection units 20 each include a plurality of self-heating sensors 201.

Further, Embodiment 1 describes the example in which two liquid surface level detection units 20 are accommodated. However, the example is merely for the description, and the number is not limited to this example. For example, three or more liquid surface level detection units 20 may be accommodated. With this configuration, the number of self-heating sensors 201 arranged per liquid surface level detection unit 20 may be reduced, and the constraints in routing the wiring may be further reduced.

Embodiment 2

In Embodiment 2 of the present invention, the self-heating sensors 201 are arranged differently from Embodiment 1. In Embodiment 2, items not described otherwise in particular are similar to those in Embodiment 1, and the same functions and components are denoted by the same reference signs.

Figure 6:
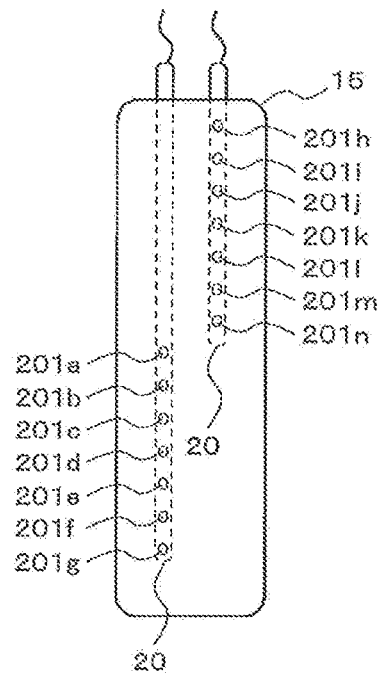
FIG. 6 is a schematic diagram for illustrating a state in which the liquid reservoir 15 according to Embodiment 2 of the present invention accommodates the liquid surface level detection unit 20.

FIG. 6 is a schematic diagram for illustrating a state in which the liquid reservoir 15 according to Embodiment 2 of the present invention accommodates the liquid surface level detection unit 20. As illustrated in FIG. 6, as the liquid reservoir 15, a vertical vessel is adopted. The self-heating sensors 201a to 201n are aligned in the direction perpendicular to the bottom surface of the liquid reservoir 15. In one of the liquid surface level detection units 20 positioned on the left side of the drawing sheet of FIG. 6, the self-heating sensors 201a to 201g are arranged. In one of the liquid surface level detection units 20 positioned on the right side of the drawing sheet of FIG. 6, the self-heating sensors 201h to 201n are arranged.

From the upper side of the liquid reservoir 15, the self-heating sensors 201h, 201i, 201j, 201k, 201l, 201m, 201n, 201a, 201b, 201c, 201d, 201e, 201f, and 201g are arranged. The self-heating sensors 201a to 201g are arranged so that distances between adjacent self-heating sensors are equal, for example. The self-heating sensors 201h to 201n are arranged so that distances between adjacent self-heating sensors are equal, for example.

As described above, in the liquid reservoir 15 of Embodiment 2 of the present invention, the plurality of liquid surface level detection units 20 each include the plurality of self-heating sensors 201, and all of the self-heating sensors 201 are positioned at different heights. Further, the self-heating sensors 201h to 201n are arranged at higher positions than that of the self-heating sensors 201a to 201g.

With this configuration, fewer constraints are imposed in routing the wiring than that in the related art. Consequently, a larger number of self-heating sensors 201 may be arranged than that in the related art, and a resolution of determining a liquid amount is improved. With this configuration, even when the refrigerant is changed by a minute amount, the change is detected, and hence leakage of the refrigerant from the refrigerating and air-conditioning apparatus 100 is detected in an early stage. In particular, when a refrigerant having adverse effects on the global environment, such as global warming, is used, the leakage of the refrigerant is prevented from occurring, and thus this configuration advantageously leads to protection of the global environment.

When three or more liquid surface level detection units 20 are accommodated, for example, self-heating sensors of a liquid surface level detection unit 20 to be added are preferred to be positioned below the self-heating sensor 201g or above the self-heating sensor 201h. In other words, when a liquid surface level detection unit 20 is newly added, the self-heating sensors of the added liquid surface level detection unit 20 are preferred to be not positioned between the self-heating sensor 201a and the self-heating sensor 201g, and to be not positioned between the self-heating sensor 201n and the self-heating sensor 201h. In other words, at positions in the vertical direction outside the range in which the plurality of self-heating sensors of one liquid surface level detection unit 20 are arranged, all self-heating sensors of liquid surface level detection unit 20 other than the one liquid surface level detection unit 20 are preferred to be arranged. With this configuration, also when three or more liquid surface level detection units 20 are accommodated, the effects of Embodiment 2 described above can be obtained.

Embodiment 3

Embodiment 3 of the present invention is different from Embodiment 1 in that arrangement of a plurality of liquid surface level detection units 20 is determined on the basis of the positions of the self-heating sensors 201 and the position of the inflow pipe 151. In Embodiment 3, items not described otherwise in particular are similar to those in Embodiment 1, and the same functions and components are denoted by the same reference signs.

Figure 7:
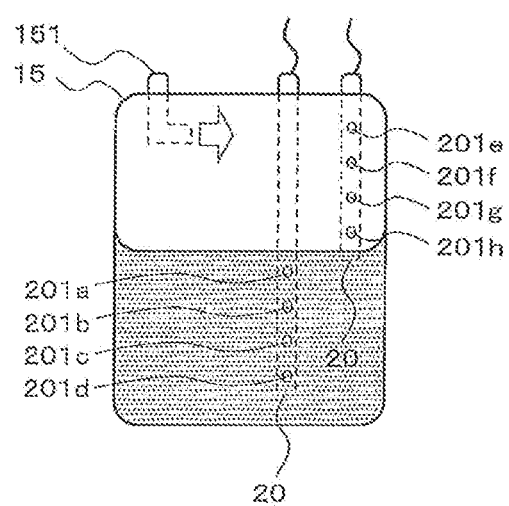
FIG. 7 is a schematic diagram for illustrating a state in which the liquid reservoir 15 according to Embodiment 3 of the present invention accommodates the liquid surface level detection unit 20.

FIG. 7 is a schematic diagram for illustrating a state in which the liquid reservoir 15 according to Embodiment 3 of the present invention accommodates the liquid surface level detection units 20. As illustrated in FIG. 7, as the liquid reservoir 15, a vertical vessel is adopted. The self-heating sensors 201a to 201h are aligned in the direction perpendicular to the bottom surface of the liquid reservoir 15, for example. In one of the liquid surface level detection units 20 positioned on the left side of the drawing sheet of FIG. 7, the self-heating sensors 201a to 201d are arranged. In one of the liquid surface level detection units 20 positioned on the right side of the drawing sheet of FIG. 7, the self-heating sensors 201e to 201h are arranged.

From the upper side of the liquid reservoir 15, the self-heating sensors 201e, 201f, 201g, 201h, 201a, 201b, 201c, and 201d are arranged. In a liquid reservoir 15 arranged at a position closest to the inflow pipe 151 among a plurality of liquid reservoirs 15, the liquid surface level detection unit 20 including the self-heating sensors 201a to 201d is accommodated. In a liquid reservoir 15 arranged at a position horizontally farthest from the inflow pipe 151 among the plurality of liquid reservoirs 15, the liquid surface level detection unit 20 including the self-heating sensors 201e to 201h is accommodated. In other words, a position of one of the plurality of liquid surface level detection units 20 each including a plurality of self-heating sensors 201 is higher as distance is horizontally farther from the inflow pipe 151 to the one of the plurality of liquid surface level detection units 20. The self-heating sensors 201a to 201d are arranged so that distances between adjacent self-heating sensors are equal, for example. The self-heating sensors 201e to 201h are arranged so that distances between adjacent self-heating sensors are equal, for example.

As described above, in the liquid reservoir 15 of Embodiment 3 of the present invention, the plurality of self-heating sensors 201 of the liquid surface level detection unit 20 arranged horizontally farthest from the inflow pipe 151 among the plurality of liquid surface level detection units are at the positions higher than the plurality of self-heating sensors 201 of liquid surface level detection units 20 other than the farthest liquid surface level detection unit 20. As described above, the self-heating sensors 201 positioned on a side of a higher liquid surface are arranged at positions horizontally farther away from the inflow pipe 151. Consequently, influences of liquid surface splash and waves in the vicinity of a liquid surface due to a blowout flow when an inflow rate is high are reduced, and accuracy of detecting the liquid surface when the liquid surface is high is improved. Thus, false detection of the liquid surface under inflow conditions of the high liquid surface and the high flow rate can be reduced, and the liquid surface level can be determined at high accuracy irrespective of the height of the liquid surface.

When three or more liquid surface level detection units 20 are accommodated, for example, a liquid surface level detection unit 20 having self-heating sensors at heights lower than the self-heating sensor 201d is preferred to be added. Further, the added liquid surface level detection unit 20 is preferred to be arranged closer to the inflow pipe 151 than the liquid surface level detection unit 20 including the self-heating sensors 201a to 201d. With this configuration, also when three or more liquid surface level detection units 20 are accommodated, the effects of Embodiment 3 described above can be obtained.

Embodiment 4

Embodiment 4 of the present invention is different from Embodiment 1 in that the liquid surface level detection units 20 are accommodated in a horizontal liquid reservoir 15. In Embodiment 4, items not described otherwise in particular are similar to those in Embodiment 1, and the same functions and components are denoted by the same reference signs.

Figure 8:
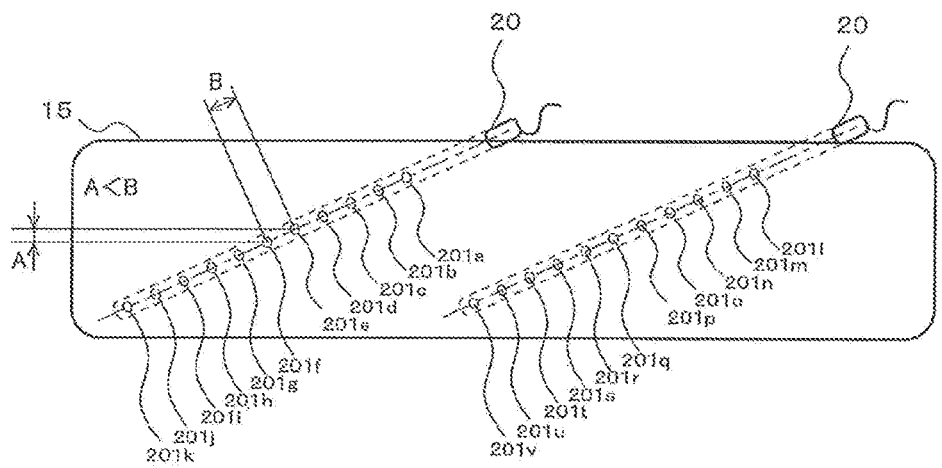
FIG. 8 is a schematic diagram for illustrating a state in which the liquid reservoir 15 according to Embodiment 4 of the present invention accommodates the liquid surface level detection unit 20.

FIG. 8 is a schematic diagram for illustrating a state in which the liquid reservoir 15 according to Embodiment 4 of the present invention accommodates the liquid surface level detection units 20. As illustrated in FIG. 8, as the liquid reservoir 15, a horizontal vessel is adopted. The self-heating sensors 201a to 201k are aligned to be inclined at an acute angle from the direction perpendicular to the bottom surface of the liquid reservoir 15. In one of the liquid surface level detection units 20 positioned on the left side of the drawing sheet of FIG. 6, the self-heating sensors 201a to 201g are arranged. In one of the liquid surface level detection units 20 positioned on the right side of the drawing sheet of FIG. 6, the self-heating sensors 201h to 201n are arranged.

From the upper side of the liquid reservoir 15, the self-heating sensors 201l, 201a, 201m, 201b, 201n, 201c, 201o, 201d, 201p, 201e, 201q, 201f, 201r, 201g, 201s, 201h, 201t, 201i, 201u, 201j, 201v, and 201k are arranged. That is, the self-heating sensors 201a to 201k and the self-heating sensors 201l to 201v are arranged at different height positions from each other. In other words, the self-heating sensors 201a to 201v are arranged in zigzag. Further, the self-heating sensors 201a to 201k are arranged so that distances between adjacent self-heating sensors are equal, for example. The self-heating sensors 201l to 201v are arranged so that distances between adjacent self-heating sensors are equal, for example.

Because the self-heating sensors 201a to 201k are aligned to be inclined at the acute angle from the direction perpendicular to the bottom surface of the liquid reservoir 15, when a difference in height between adjacent self-heating sensors is represented by A, and a distance between the adjacent self-heating sensors is represented by B, a relation of A<B is satisfied. Because dimensions of the liquid reservoir 15 are defined to satisfy the relation of A<B, an arrangement interval between self-heating sensors 201 arranged in the vertical direction of the liquid reservoir 15 can be reduced. Consequently, a resolution of determining a liquid amount is improved.

As described above, the self-heating sensors 201 of the liquid reservoir 15 according to Embodiment 4 of the present invention are aligned to be inclined at the acute angle from the direction perpendicular to the bottom surface of the liquid reservoir 15.

With this configuration, when the liquid reservoir 15 includes a horizontal vessel, in particular, the resolution of determining the liquid amount can be improved. Consequently, even a minute change in amount of the refrigerant is determined, and hence leakage of the refrigerant from the refrigerating and air-conditioning apparatus 100 is detected in an early stage. In particular, when a refrigerant having adverse effects on the global environment, such as global warming, is used, the leakage of the refrigerant is prevented from occurring, and thus this configuration advantageously leads to protection of the global environment.

Further, the configuration is useful also when the height of the liquid reservoir 15 is lower than a distance between the self-heating sensor 201a positioned at the top and the self-heating sensor 201k positioned at the bottom. To be specific, when the self-heating sensors 201a and 201k are aligned in the direction perpendicular to the bottom surface of the liquid reservoir 15, the self-heating sensors 201a and 201k are wasted without being used as liquid surface detection sensors.

The inclination angle is not limited to a particular angle, and a suitable angle may be adopted as appropriate. For example, when the liquid surface level detection unit 20 is arranged perpendicular to the bottom surface of the liquid reservoir 15 and a self-heating sensor 201 is not contained in the liquid reservoir 15, an angle is preferred to be adopted at which the self-heating sensor 201 is contained in the liquid reservoir 15.

Further, also in the liquid reservoir 15 including the vertical vessel, when, under a state in which all the self-heating sensors 201 are arranged vertically, a distance between the self-heating sensor 201 positioned at the top and the self-heating sensor 201 positioned at the bottom is larger than the height of the liquid reservoir 15, the self-heating sensors 201 may be aligned to be inclined from the direction perpendicular to the bottom surface of the liquid reservoir 15 to obtain similar effects as in Embodiment 4 described above.

Embodiment 5

Embodiment 4 of the present invention is different from Embodiment 1 in that the liquid surface level detection units 20 are accommodated in a horizontal liquid reservoir 15. In Embodiment 5, items not described otherwise in particular are similar to those in Embodiment 1, and the same functions and components are denoted by the same reference signs.

Figure 9:
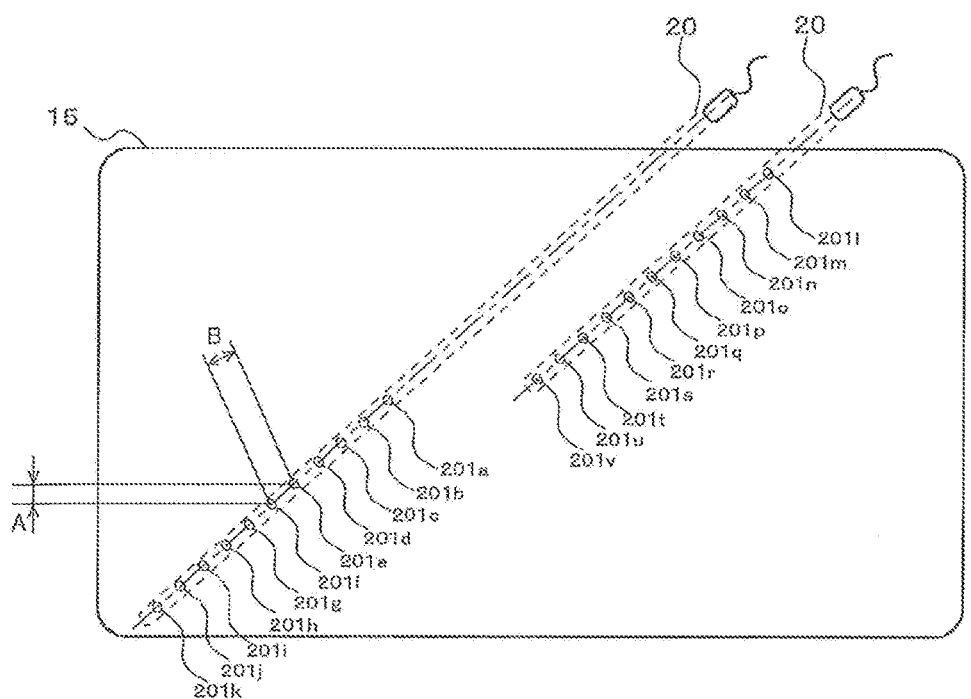
FIG. 9 is a schematic diagram for illustrating a state in which the liquid reservoir 15 according to Embodiment 5 of the present invention accommodates the liquid surface level detection unit 20.

FIG. 9 is a schematic diagram for illustrating a state in which the liquid reservoir 15 according to Embodiment 5 of the present invention accommodates the liquid surface level detection units 20. As illustrated in FIG. 9, as the liquid reservoir 15, a horizontal vessel is adopted. The liquid surface level detection units 20 are arranged to be inclined from the direction perpendicular to the bottom surface of the liquid reservoir 15.

From the upper side of the liquid reservoir 15, the self-heating sensors 201$l$, 201$m$, 201$n$, 201$o$, 201$p$, 201$q$, 201$r$, 201$s$, 201$t$, 201$u$, 201$v$, 201$j$, 201$v$, 201$a$, 201$b$, 201$c$, 201$d$, 201$e$, 201$f$, 201$g$, 201$h$, 201$i$, 201$j$, and 201$k$ are arranged. Further, the self-heating sensors 201$a$ to 201$g$ are arranged so that distances between adjacent self-heating sensors are equal, for example. The self-heating sensors 201$h$ to 201$n$ are arranged so that distances between adjacent self-heating sensors are equal, for example.

Because the self-heating sensors 201$a$ to 201$k$ are aligned to be inclined at the acute angle from the direction perpendicular to the bottom surface of the liquid reservoir 15, when a difference in height between adjacent self-heating sensors is represented by A, and a distance between the adjacent self-heating sensors is represented by B, a relation of A<B is satisfied. Because dimensions of the liquid reservoir 15 are defined to satisfy the relation of A<B, an arrangement interval between self-heating sensors 201 arranged in the vertical direction of the liquid reservoir 15 can be reduced. Consequently, a resolution of determining a liquid amount is improved.

As described above, the self-heating sensors 201 of the liquid reservoir 15 according to Embodiment 5 of the present invention are aligned to be inclined at the acute angle from the direction perpendicular to the bottom surface of the liquid reservoir 15.

With this configuration, when the liquid reservoir 15 includes a horizontal vessel, in particular, the resolution of determining the liquid amount can be improved. Consequently, even a minute change in amount of the refrigerant is determined, and hence leakage of the refrigerant from the refrigerating and air-conditioning apparatus 100 is detected in an early stage. In particular, when a refrigerant having adverse effects on the global environment, such as global warming, is used, the leakage of the refrigerant is prevented from occurring, and thus this configuration advantageously leads to protection of the global environment.

Further, the configuration is useful also when the height of the liquid reservoir 15 is lower than a distance between the self-heating sensor 201$a$ positioned at the top and the self-heating sensor 201$k$ positioned at the bottom. To be specific, when the self-heating sensors 201$a$ and 201$k$ are aligned in the direction perpendicular to the bottom surface of the liquid reservoir 15, the self-heating sensors 201$a$ and 201$k$ are wasted without being used as liquid surface detection sensors.

The above describes, as an example, the liquid reservoir 15 for forming the refrigerating and air-conditioning apparatus 100; however, the use of the method of installing a multi-point liquid surface detection sensor according to the present invention is not limited to this example, and the technology can be applied to any purpose of detecting a height of an interface between water and air, oil and air, and other liquid and gas in a vessel.

REFERENCE SIGNS LIST 11 compressor 12 condenser 13 expansion valve 14 evaporator 15 liquid reservoir 20 liquid surface level detection unit 100 refrigerating and air-conditioning apparatus 151 inflow pipe 152 outflow pipe 200, 201$a$ to 201$v$ self-heating sensor 202 sheath tube 203 wiring

The invention claimed is:

1. A liquid reservoir comprising a plurality of liquid surface level detection units, wherein
each of the liquid surface level detection units includes a plurality of self-heating sensors, which are positioned at different heights,
the liquid reservoir comprising an inflow pipe through which refrigerant flows into the liquid reservoir at an upper portion of the liquid reservoir,
one of the liquid surface level detection units is arranged horizontally farther from the inflow pipe than a remainder of the liquid surface level detection units, and the self-heating sensors of the one liquid surface level detection unit are located higher than the self-hating sensors of the remainder of the plurality of liquid surface level detection units.

2. The liquid reservoir of claim 1, wherein in any pair of the liquid surface level detection units, a first one of the pair is farther from the inflow pipe than a second one of the pair, and the self-heating sensors of the first one of the pair are located higher than the self-heating sensors of the second one of the pair.

3. The liquid reservoir of claim 1, wherein the self-heating sensors of the plurality of liquid surface level detection units are aligned in a direction perpendicular to a bottom surface of the liquid reservoir.

4. The liquid reservoir of claim 1, wherein the self-heating sensors of the plurality of liquid surface level detection units are aligned to be inclined at an acute angle from a direction perpendicular to a bottom surface of the liquid reservoir.

* * * * *